(12) United States Patent
Gerhart

(10) Patent No.: US 11,086,989 B2
(45) Date of Patent: Aug. 10, 2021

(54) SMART DEVICE SECURITY COMPROMISED WARNING APPARATUS AND METHOD

(71) Applicant: Western Digital Technologies, Inc., San Jose, CA (US)

(72) Inventor: Darin Edward Gerhart, Oronoco, MN (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 272 days.

(21) Appl. No.: 15/860,622

(22) Filed: Jan. 2, 2018

(65) Prior Publication Data

US 2019/0205535 A1 Jul. 4, 2019

(51) Int. Cl.
*G06F 21/55* (2013.01)
*G06F 21/44* (2013.01)
*G06F 21/62* (2013.01)

(52) U.S. Cl.
CPC .......... *G06F 21/554* (2013.01); *G06F 21/44* (2013.01); *G06F 21/552* (2013.01); *G06F 21/6245* (2013.01); *G06F 2221/034* (2013.01)

(58) Field of Classification Search
CPC .... G06F 21/44; G06F 21/554; G06F 21/6245; G06F 2221/034; G06F 11/3058; G06F 21/86; G06K 7/0095; G08B 13/1436; G08B 13/1409
See application file for complete search history.

(56) References Cited

U.S. PATENT DOCUMENTS

| | | | | |
|---|---|---|---|---|
| 7,673,185 B2* | 3/2010 | Kalwitz | ............ | G06F 11/0727 714/4.1 |
| 8,046,378 B1* | 10/2011 | Zhuge | .............. | G06F 16/122 707/783 |
| 9,235,975 B2* | 1/2016 | Gettings | ............ | G01N 21/84 |
| 9,710,644 B2* | 7/2017 | Reybok | .............. | H04L 63/145 |
| 9,811,692 B2* | 11/2017 | Alarabi | ............ | H04W 12/12 |
| 9,818,004 B1* | 11/2017 | Rezayee | .......... | G06K 7/0095 |
| 10,398,233 B2* | 9/2019 | Hoyt | ...................... | A47C 1/03 |
| 2007/0040678 A1* | 2/2007 | Kojo | ................ | G08B 13/1436 340/568.1 |
| 2011/0119686 A1* | 5/2011 | Chen | .................. | G06F 3/0607 719/326 |
| 2011/0200052 A1* | 8/2011 | Mungo | ................ | H04W 4/70 370/401 |
| 2012/0198242 A1* | 8/2012 | Dalzell | ................ | G06F 21/55 713/190 |
| 2014/0330756 A1* | 11/2014 | Thapliyal | ............. | G06N 5/025 706/12 |
| 2016/0283751 A1* | 9/2016 | Arora | .................. | G06F 21/86 |
| 2016/0321815 A1* | 11/2016 | Bartley | ................ | G06F 16/29 |
| 2017/0094018 A1* | 3/2017 | Ekstrom | .............. | H04W 8/16 |

(Continued)

*Primary Examiner* — Kevin Bechtel
*Assistant Examiner* — Sangseok Park
(74) *Attorney, Agent, or Firm* — Patterson & Sheridan, LLP; Steven H. Versteeg

(57) ABSTRACT

A method and arrangement for providing warnings based upon potential security compromising actions is discussed. Monitoring of system changes, temperature, humidity, power levels and reconfiguration of system components is performed and compared to threshold levels, with warning generated when monitored conditions fall outside of expected bounds.

23 Claims, 9 Drawing Sheets

(56) References Cited

U.S. PATENT DOCUMENTS

| | | | |
|---|---|---|---|
| 2017/0201724 A1* | 7/2017 | Galvin | G08B 13/19669 |
| 2018/0062877 A1* | 3/2018 | Iyengar | F25D 29/008 |
| 2018/0186331 A1* | 7/2018 | Dubal | G09F 21/048 |
| 2018/0341773 A1* | 11/2018 | Khatri | G06F 21/78 |

* cited by examiner

Fig. 5

DSCM CONTROL MODE PAGE FORMAT

| BYTE | BIT 7 | 6 | 5 | 4 | 3 | 2 | 1 | 0 |
|---|---|---|---|---|---|---|---|---|
| 0 | PS | SPF = 1 | PAGE CODE = TBD (VENDOR UNIQUE SPACE) | | | | | |
| 1 | SUBPAGE CODE = TBD (VENDOR UNIQUE SPACE) | | | | | | | |
| 2 - 3 | PAGE LENGTH = n - 3 | | | | | | | |
| 4 - n | DSCM PARAMETER DESCRIPTORS (0-11) | | | | | | | |

Fig. 6

DSCM PARAMETER DESCRIPTOR FORMAT

| BYTE | BIT 7 | 6 | 5 | 4 | 3 | 2 | 1 | 0 |
|---|---|---|---|---|---|---|---|---|
| 0 | ENABLE | | | DSCM PARAMETER ID | | | | |
| 1 | PRIMARY THRESHOLD | | | | | | | |
| 2 | SECONDARY THRESHOLD | | | | | | | |
| 3 | RELATIVE TRIGGER PRIORITY | | | | | | | |

| PARA. ID | PARAMETER NAME | PARAMETER DESCRIPTION AND DSCM METHODOLOGY | PRIMARY THRESHOLD DEFINITION | SECONDARY THRESHOLD DEFINITION |
|---|---|---|---|---|
| 0x10 | RV SENSOR | MONITOR ACCELERATION DURING POWER OFF CONDITIONS USING POWER PROVIDE BY BACK-UP CAPACITOR (SSD) OR BACK-EMF (HDD) | ACCELERATION IN DIRECTION AWAY FROM SAS CONNECTOR (>.01 m/s) | NONE |
| 0x11 | TEMPERATURE | MONITOR TEMPERATURE CHANGES ACROSS POWER CYCLE AT 30s INTERVALS FOR 10m TO DETERMINE INITIAL AMBIENT TEMPERATURE AND STEADY STATE TEMPERATURE AFTER DEVICE WARM-UP | TEMPERATURE DELTA (>5°C) | TIME UNTIL SUBSEQUENT POWER CYCLE (<24h) |
| 0x12 | POWER MEASUREMENT | MONITOR INPUT SUPPLY VOLTAGES (5V/12V) FOR DIFFERENCES ACROSS POWER CYCLES. | VOLTAGE DELTA (>5%) | TIME UNTIL SUBSEQUENT POWER CYCLE (<24h) |
| 0x13 | RELATIVE HUMIDITY | MONITOR RELATIVE HUMIDITY ACROSS POWER CYCLES. | HUMIDITY DELTA (>5%) | TIME UNTIL SUBSEQUENT POWER CYCLE (<24h) |
| 0x14 | GPS LOCATION | MONITOR FOR CHANGES IN LOCATION COORDINATES ACROSS POWER CYCLES | LOCATION DELTA (>1M) | TIME UNTIL SUBSEQUENT LOCATION CHANGE (<24h) |

*Fig. 7A*

| | | | |
|---|---|---|---|
| 0x20 | HOST PHY WWID | MONITOR CONNECTED HOST PHY CHANGES ACROSS LINK RESET SEQUENCES | DIFFERENT CONNECTED PHY WWID | TIME UNTIL SUBSEQUENT CONNECTED PHY CHANGE (<24h) |
| 0x21 | INITIATOR WWID | MONITOR INITIATOR CONNECTION REQUESTS FROM INITIATORS WITH NEW WWID | NEW INITIATOR CONNECTION WWID | TIME UNTIL STOPS ACCESSING DEVICE (<24h) |
| 0x22 | PORT CONFIGURATION | MONITOR NARROW VS. WIDE PORT CONFIGURATION CHANGES ACROSS LINK RESET SEQUENCES | ANY CHANGE IN PORT CONFIGURATION | TIME UNTIL SUBSEQUENT PORT CONFIGURATION CHANGE (<24h) |
| 0x23 | PHY CONNECTION | MONITOR PHY GOING FROM UNCONNECTED TO CONNECTED STATE | ANY UNCONNECTED STATE TRANSITIONS | TIME UNTIL SUBSEQUENT CONNECTION STATE CHANGE (<24h) |
| 0x24 | PHY ACCESS PATTERN | MONITOR DATA READ ACCESS PATTERN CHANGES ACROSS EACH PHY TO DETECT CASES FROM NO/LOW ACCESS TO ACTIVE READ ACCESS | CHANGE IN READ IOPS (>1 IOPS) | TIME FOR READ IOPS INCREASE (<24h) |
| 0x30 | TCG AUTHENTICATION FAILURES | MONITORS NUMBER OF TIMES TCG AUTHENTICATION FAILS OVER A PERIOD OF TIME | AUTHENTICATION FAILURE COUNT (>2 FAILURES) | TIME (<60MIN) |
| 0x31 | ACCESS DENIED ERRORS | MONITORS NUMBER OF TIMES ACCESS DENIED ERRORS ARE REPORTED TO THE HOST OVER A PERIOD OF TIME. | ACCESS DENIED ERROR COUNT (>2 ERRORS) | TIME (<60MIN) |

DSCM LOG PAGE FORMAT

| BYTE | BIT 7 | 6 | 5 | 4 | 3 | 2 | 1 | 0 |
|---|---|---|---|---|---|---|---|---|
| 0 | DS | SPF = 1 | PAGE CODE = TBD (VENDOR UNIQUE SPACE) | | | | | |
| 1 | SUBPAGE CODE = TBD (VENDOR UNIQUE SPACE) | | | | | | | |
| 2 - 3 | PAGE LENGTH = n - 3 | | | | | | | |
| 4 - n | DSCM EVENT LOG ENTRIES (0 - x) | | | | | | | |

Fig. 9

DSCM EVENT LOG ENTRY FORMAT

| BYTE | BIT 7 | 6 | 5 | 4 | 3 | 2 | 1 | 0 |
|---|---|---|---|---|---|---|---|---|
| 0 - 3 | POH | | | | | | | |
| 4 | DSCM EVENT TYPE | | | | | | | |
| 5 | DSCW PARAMETERS TRIGGER COUNT | | | | | | | |
| 6 - n | DSCM PARAMETER INFORMATION DESCRIPTORS (0-11) | | | | | | | |

DSCM PARAMETER INFORMATION DESCRIPTOR FORMAT

| BYTE | BIT 7 | 6 | 5 | 4 | 3 | 2 | 1 | 0 |
|---|---|---|---|---|---|---|---|---|
| 0 | ENABLE | | | | | | | |
| 1-2 | DSCM PARAMETER ID | | | | | | | |
| 3 | DSCM PARAMETER VALUE | | | | | | | |
| 4 | PRIMARY THRESHOLD | | | | | | | |
| 5 | SECONDARY THRESHOLD | | | | | | | |
| | RELATIVE TRIGGER PRIORITY | | | | | | | |

*Fig. 10*

SMART DEVICE SECURITY COMPROMISED WARNING APPARATUS AND METHOD

FIELD OF THE DISCLOSURE

Aspects of the disclosure relate to memory arrangements and/or devices used with computer arrangements. More specifically, aspects of the disclosure relate to smart memory devices that provide warnings to users when a trigger event, such as a security compromised situation, is encountered.

BACKGROUND INFORMATION

Field

Device security is an increasingly important aspect for computer users. Recent changes in complexity of devices used in computer arrangements provide unwanted opportunities for intrusion of malicious software and data theft of the computer arrangements.

Users desire to minimize any opportunities for data theft. Device suppliers for computer arrangements desire to avoid data theft by closing security holes in products that are provided to computer manufacturers. There is a need, therefore, to provide devices that maintain data security despite individuals wanting to compromise the security of the devices.

Data security, however, has several parts that are integral to overall computer security. Some users, for example, desire the utmost in data security due to the sensitive nature of the data that is stored. Some users, however, do not require security at all, as the data that is stored is considered to be of minimal value. Device suppliers, therefore, have a vast range of clients to serve and must provide for each of these group needs despite vastly different security expectations. With whatever security provided, however, it is desired that the varying needs of the differing groups does not greatly increase the cost of the products produced by the device suppliers.

In secure devices, users may request to have firmware support that may actively detect situations when customer data may have been compromised. There is a need, therefore, to provide a memory arrangement or smart device, such as a solid state drive, that provides for monitoring of data intrusions.

There is also a need to prove a memory arrangement or smart device that is cost effective to manufacture, but flexible enough to provide needed security solutions to different user groups.

There is also a need to provide a memory arrangement or smart device that provides a record of activities of attempted data breaches and/or changes in component configuration to allow compilation of data for analysis for each smart device.

There is also a need to provide a device security compromised monitor (DSCM) overview to a user, such as through a log page, to alert a user of security status.

SUMMARY

The following summary is used for description purposes only and should not be considered limiting of the aspects described in the detailed description or the claims. The following description provided in the summary is merely an example of the possible alternatives of the disclosure and different aspects illustrated and described.

In one non-limiting embodiment, an arrangement is disclosed, comprising at least one memory arrangement configured to store and retrieve data, a body defining an internal volume, the at least one memory arrangement placed within the internal volume, a device security compromised monitor placed within the internal volume, at least one temperature sensor placed within the internal volume connected to the device security compromised monitor, at least one humidity sensor placed within the internal volume and connected to the device security compromised monitor, at least one global positioning system placed within the internal volume and connected to the device security compromised monitor, at least one voltage monitor placed within in the internal volume and connected to the device security compromised monitor, at least one Rotational Vibration (RV) sensor placed within the internal volume and connected to the device security compromised monitor and at least one interconnection between the memory arrangement and the device security compromised monitor and a host to transfer and receive data.

In another non-limiting embodiment, a method is disclosed comprising monitoring at least one power on event for a smart device, wherein the monitoring is related to at least one of an environmental parameter, a position, a system configuration, a power interruption, an unauthorized data access attempt, and a voltage, loading data related to at least one of a stored environmental parameter, a position, a system configuration, power interruption, an unauthorized data access attempt and a voltage from a prior power on condition, comparing the at least one environmental parameter, the position, the system configuration, power interruption, an unauthorized data access attempt and the voltage monitored for the smart device to the at least one stored environmental parameter, position, system configuration, power interruption, an unauthorized data access attempt and the voltage, determining when the at least one environmental parameter, position, system configuration, power interruption, unauthorized data access attempt and voltage, monitored for the smart device exceeds a threshold value, creating a warning when the at least one environmental parameter, position, system configuration, power interruption, unauthorized data access attempt and voltage monitored for the smart device exceeds the threshold value and storing a new environmental parameter, position, system configuration, power interruption, unauthorized data access attempt and voltage value from the monitoring of the at least one power on event for the smart device.

In one non-limiting embodiment, a method is disclosed comprising monitoring at least one data access failure event in a memory arrangement, determining when the at least one data access failure event exceeds a threshold and creating a warning when the data access failure exceeds a threshold.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is an illustration of a device security compromised monitor control mode page format diagram.

FIG. 6 is an illustration of a device security compromised monitor parameter descriptor format.

FIGS. 7A and 7B is an illustration of a device security compromised monitor parameter list overview.

FIG. 8 is an illustration of a device security compromised monitor log page format.

FIG. 9 is an illustration of a device security compromised monitor event log entry format.

FIG. 10 is an illustration of a device security compromised monitor parameter information descriptor format.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
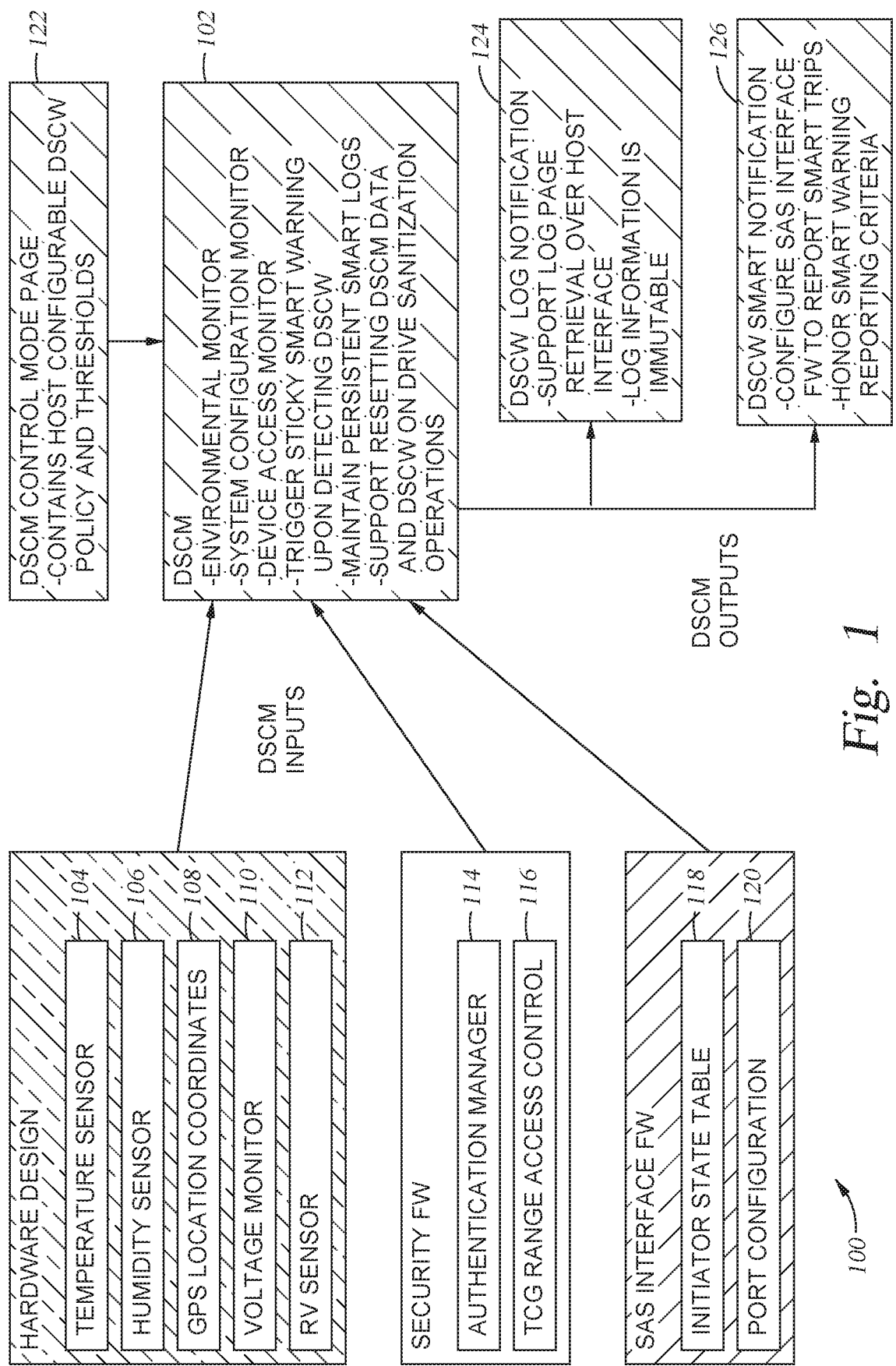
FIG. 1 is an illustration of a device security compromised monitor block diagram.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim. Likewise, reference to "the disclosure" shall not be construed as a generalization of an inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

In the embodiments described, a memory storage arrangement (smart device) is connected to a host system through an interface. The host system, in the illustrated embodiments is a computer or a server so the computer may transmit and receive data from a data storage arrangement. The function of the data storage arrangement is to accept and store data until the data is needed by a user or the host. The data storage arrangement may have to accept large bursts of data at a rapid pace, depending on the computer processes performed, therefore the data storage arrangement is configured with multiple memory units, formed into arrays, that provide for various states of usage. Dies may write data to the arrays, as necessary, to complete the memory storage functions.

Certain sections of the smart device may be configured of memory systems that provide for fast action (low latency) so that computer processes may be conducted at a rapid pace. Such low latency action may be accomplished by single layer cell memory configurations. If bulk amounts of data are required to be stored, multiple layer cell memory configurations are also present, such as triple level cell memory configurations. The data storage arrangement, with the specific arrays, may therefore be configured from single level or multi-level cell arrangements. The data storage arrangement may have an interface that allows the data storage arrangement to connect with the host and allow for synchronization of the host and the data storage arrangement. The interface may be a SATA compatible interface, as a non-limiting embodiment. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. A body, defining an interior volume is provided to house memory components and the interface, as well as sensors, processors and other devices, described later. The body may allow for the materials to be installed in a plug and play configuration, allowing storage and retention of data, as necessary.

Auxiliary connections may be provided to the data storage arrangement to allow for additional options for inputting data directly to the data storage arrangement without interfacing with a host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used. The throttling capabilities of the memory arrangement, therefore, may be used in capacities where writing of data is necessary.

Internal software may be provided with the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

A controller is provided to control actions of the solid state drive as required by the host. The controller may also be configured to perform maintenance activities for the solid state drive to allow for efficient use. The controller may be provided with code that interfaces with the internal software of the solid state drive to allow the controller to perform the various functions required. The controller, for example, may interact with the dies of the solid state drive to allow for reading or writing of data to the solid state drive.

In embodiments described, device security for memory arrangements, such as a solid state drive, is enhanced through various described arrangements and methods. The various described arrangements are described below and methods using these arrangements are further disclosed. By use of these arrangements and methods, a user may minimize the opportunity for data theft.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

Smart devices used in conjunction with computer arrangements are disclosed. Some smart devices include Self-Monitoring, Analysis and Reporting Technology (SMART) to monitor device operation and usage and provide reporting mechanism to the host system if there are any detected issues or problems. A smart device that support SMART monitoring system is referred to as a SMART device. In one non-limiting embodiment, a SMART device is disclosed that provides a device security compromised warning (DSCW) that is produced and managed by a device security compromised monitor (DSCM). The device, in one non-limiting embodiment, is a computer storage device, such as a solid state drive. The DSCM may actively monitor the computer storage device for potential situations where customer data may have been compromised or is in the process of being compromised. In certain embodiments, the DSCM maintains a log page with events that occur to the computer storage device for retention at a future time. If certain predefined events occur, the DSCM triggers a SMART device security compromised warning (DSCW) if user data has potentially been compromised. The SMART device security compromised warning is controlled via interface standard controls and reporting mechanisms for SMART functionality.

The DSCM may monitor device parameters, through the below described monitoring systems and methods, to detect possible situations where customer data may be compromised: 1) Device Environmental Monitor, 2) System Configuration Monitor, 3) Device Access Violations. The device environmental monitor may monitor a device environment for possible movement of the storage device between host computer systems without data sanitization. A system configuration monitor checks for system configuration changes where cables may have been re-configured and a new host may have been connected without data sanitization. Device access violations may monitor the storage device for attempts to access data without valid authentication.

The DSCM may be configured via a device security compromised monitor control mode page to enable a user to adjust thresholds, if necessary. In embodiments described, device security compromised monitor mode page changes are not able to reset triggered device security compromised warnings previously set. In still further embodiments, changes to device security compromised monitor controls are not effective until a next data sanitization and DSCM continues to run under the policy provided by previous parameters.

A DSCW is triggered if the DSCM detects criteria established for possible compromised customer data. The DSCW may persist in the device until a data sanitization process is completed on compromised data through one of the following mechanisms: 1) Sanitize command, 2) TCG revert operation to reset the device back to original manufactured encryption state, and 3) TCG key erase is performed for compromised data.

In specific embodiments, the DSCM log information is persistent and immutable over the life of the storage device (drive). The DSCM log may contain the full history of all recorded events and any DSCW triggers. The DSCM log may also contain the history of all data sanitization events and DSCM control mode page changes. In embodiments provided, the DSCM log may be retrievable by the host at any time. In still further embodiments, the DSCM log may be remotely monitored.

In embodiments, the DSCM device environmental monitor provides specific capabilities in monitoring activities that the storage device experiences. The DSCM may also be configured to monitor location changes across power cycles. As will be understood, temporary device movement from an installed system to an alternate location could be an indicator of device tampering or potential silent data theft.

In other embodiments, the DSCM provides an environmental hot pull parameter that is monitored. In these embodiments, the DSCM monitors RV sensors to detect acceleration during loss of host provided power while power is supplied by a hold-up capacitor (for a solid state drive) or back-EMF (HDD) which would indicate that the device was pulled from the original host system. In further embodiments, the DSCM monitors an environmental temperature parameter within the device. In these embodiments, detection of temperature differences is performed (actual measurement compared to a standard) that may exist between device locations (e.g. being in an enclosed system vs. being on a testing bench). The values may also be measured during power-up operations to compare to previous initial temperature or previous power-down temperature. Additional measurements may also be taken, for example, comparing a steady state temperature to a previous steady state temperature.

Another parameter may be monitored, namely a power parameter. Monitoring of the power parameter may occur wherein differences in the +5V or +12V incoming power levels may be detected to identify different power supplies (e.g. 4.9 V voltage in System vs. 5.3 V on bench). Such identification of different power supply values may be identified and reported in a log recording all DSCW alerts.

Relative humidity may also be monitored within the storage device. In certain circumstances, models of the storage device may be equipped with a humidity sensor to allow the device to actively monitor relative humidity and support T10 environmental reporting log pages. The DSCM may monitor changes in relative humidity across power cycles.

In other embodiments, the storage device may be equipped with a global positioning system (GPS) receiver to allow the device to actively monitor a location. The DSCM may detect changing physical locations to trigger the DSCW. As a person of skill in the art would recognize, differing thresholds may be instituted for change of physical location before a warning is generated. Such thresholds may be provided at the time of manufacture, for example. In other embodiments, the thresholds may be user defined.

The DSCM is also provided with a system configuration monitor. The system configuration monitor provides surveillance of the storage device and the connections to the storage device. The DSCM may monitor system configuration parameters to detect cable changes or new host attachments. In one non-limiting embodiment, temporary cable changes or different port usage may indicate unauthorized device access and potential silent data theft. Changes identified by the system configuration monitor may trigger a DSCW and subsequent write to a log.

The DSCM may also track and verify connected host PHY WWID parameters. The DSCM may maintain persistent history of previously connected WWNs. During link reset sequences, the DSCM may check the received identify frame for changes in the device name or SAS address from the previous link reset sequence and monitor the amount of time the configuration persists. The temporary difference in these addresses for short duration may be an indication that the system cabling has been reconfigured. As with the other embodiments, changes in the parameters may trigger a DSCW and subsequent write to a log.

During SAS connections, the DSCM may search a history of initiator WWNs to determine if there is a match with the source address in the open address frame for the incoming connection request. The amount of time the initiator continues to access the device data may be monitored and written to the log.

The DSCM may monitor port configurations of the host. In non-limiting embodiments, the DSCM may monitor PHYS for changes in port configuration at each link reset sequence (includes both power cycles and cable pull/insert). In a non-limiting embodiment, wide port vs. narrow port configuration changes may indicate a change in the device usage.

Physical connection parameters may also be measured by the DSCM. The DSCM may monitor PHYS for changes in PHY connection states where an unconnected port becomes connected. Such activity may suggest a cable configuration change where a new host is being connected to the device. Changes may be identified in the log.

Physical access pattern parameters may also be monitored by the DSCM. In these embodiments, the DSCM may monitor relative PHY usage changes where there are changes relative to traffic between a primary and second PHY. In embodiments, abrupt changes in data access activity on different PHY may indicate that new hosts or applications are being used to access device.

The DSCM may also be configured, in certain embodiments, to monitor data acquisition attempt parameters to detect potential unauthorized access of data. Unsuccessful attempts to gain access to protected data (e.g. encrypted, read locked, write locked) may indicate unauthorized device access and potential silent data theft. Unsuccessful attempts may be recorded in the log.

The DSCM may also monitor all authentication attempts and log unsuccessful attempts. As a non-limiting embodiment, the DSCM monitors a number of unsuccessful authentication attempts over a configurable time period. Following an initial device installation into a host system, unsuccessful authentication events may indicate an attempt to obtain unauthorized access to customer data. In still further embodiments, the DSCM may monitor the number of media access commands that are rejected due to "No access rights" errors over a configurable period of time. Following an initial device installation into a host system, access denied errors may also indicate attempts to obtain unauthorized access to customer data.

Referring to FIG. 1, a DSCM block diagram 100 is illustrated. The DSCM 102 is provided with an environmental monitor, a system configuration monitor, and a device access monitor. The DSCM 102 is further configured to trigger sticky SMART warning upon detecting DSCW. The DSCM 102 is also configured to maintain persistent SMART logs of activities that occur. The DSCM 102 is also configured to support resetting of DSCM data and DSCW on drive sanitization operations. Different DSCM inputs are provided to the DSCM 102. A temperature sensor 104, a humidity sensory 106, GPS 108, voltage monitor 110 and RV sensor 112 are provided with the storage device. The temperature sensor 104 is positioned to monitor instant temperature of storage device which can be compared to threshold values. In a likewise manner, the humidity sensor 106 is provided to measure ambient humidity in the storage device which may be compared to threshold values. The GPS monitor 108 may be provided to track location of the storage device. The GPS values may be recorded in the log. In embodiments where a storage device is to be located on a permanent basis, a threshold value may be compared to GPS values determined by the GPS monitor 108 to determine if the storage device has appreciably moved.

Security firmware is also provided, in specific embodiments, to create inputs to the DSCM 102. An authentication manager 114 is used to authenticate connections to the storage device. A TCG range access control 116 is also provided as an input to the DSCM 102.

SAS interface firmware is also provided as an input to the DSCM 102. An initiator state table 118 as well as a port configuration 120 may be provided. A DSCM control mode page 122 may also be used as an input to the DSCM to allow the DSCM to be configurable to the desires of the user and to help in the setting of thresholds for the sensors and monitors.

DSCM outputs are provided, in specific embodiments, to provide logs with specific information placed for review by a user. The DSCW log information 124 may be retrieved over a host interface. The log information, in non-limiting embodiments, is immutable. DSCW smart notifications 126 may also be provided. These SMART notifications may be configurable and may indicate that specific SMART trips have occurred.

Figure 2:
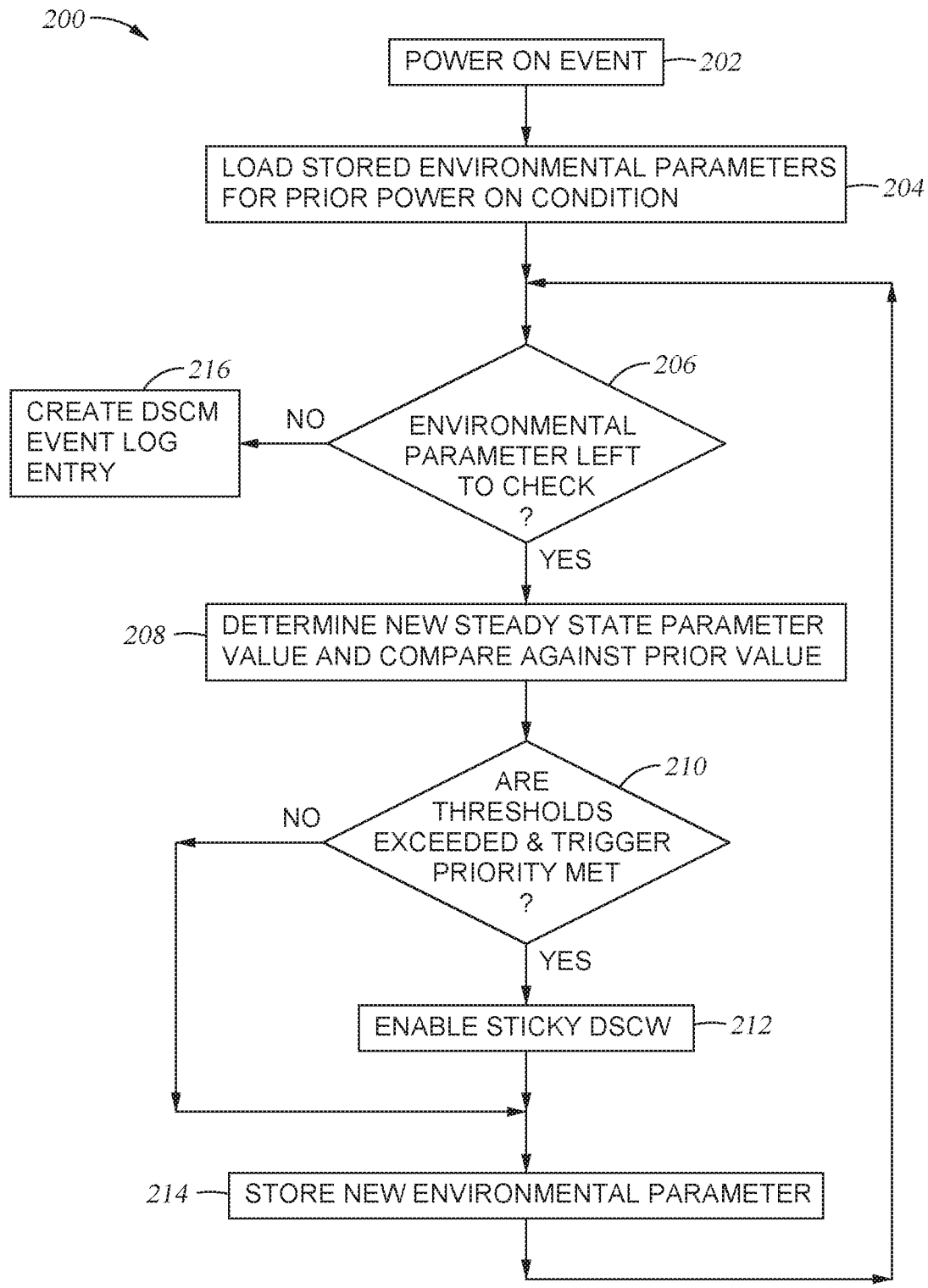
FIG. 2 is an illustration of a device security compromised monitor power on event flow chart.

Referring to FIG. 2, a power on event DSCM event flow diagram is illustrated. The method 200 provided in FIG. 2 describes actions taken in relation to monitoring of a power on event happening for a storage device. At 202, a power on event occurs. At 204, environmental parameters that are stored in the storage device are loaded into a memory in a computer. At 206, a query is run, wherein it is determined if there is an environmental parameter left to check. If there is no environmental parameter to check, the process proceeds to 216 and a DSCM event log entry is created. If there is an environmental parameter to check at 206, a new steady state parameter value is determined and compared to a prior steady state parameter at 208. At 210, a query is run to determine if any thresholds are exceeded and a trigger priority is met for the comparison performed at 208. If there are no thresholds met or trigger priorities met, then the new environmental parameter may be stored at 214 and the method continued at 206. If thresholds are exceeded and the trigger priority is met, then a DSCW (sticky) is generated at 212 and the method continues to 214. The DSCW may be written to a log for permanent recording and future retrieval. In other embodiments, the DSCW may be configured to be immediately viewed by a user, prompting user action.

Figure 3:
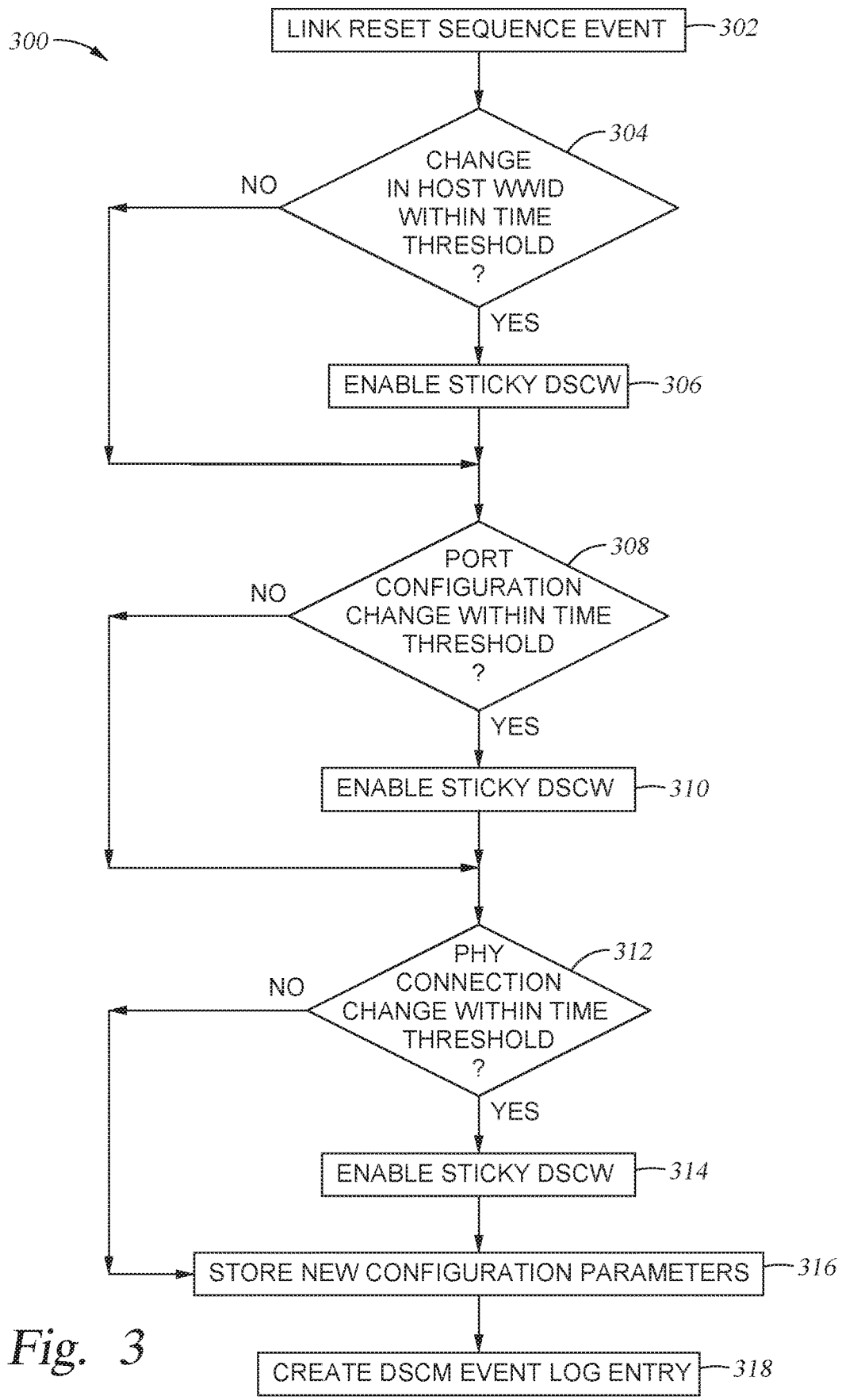
FIG. 3 is a link reset sequence event flow chart.

Referring to FIG. 3, a link reset sequence event flow diagram 300 is illustrated. At 302, a link reset sequence event is performed. The method then proceeds to 304 where a query is run to determine if there is a change in the host WWID within a specified time threshold. If there is no change in the host WWID within the time threshold, then the method proceeds to 308. If there is a change in the host WWID within the time threshold at 304, then a DSCW (sticky) is created at 306. The DSCW may be written to a log for further action and recording. The method then proceeds to 308, wherein a query is run to determine if there is a port configuration change within a specified time threshold. If there is no port configuration change, then the method proceeds to 312. If there is a port configuration change within the threshold, then a DSCW (sticky) is enabled at 310. The DSCW may be written to a log for further action and recording. The method then proceeds to 312. At 312, a query is run to determine if there is a PHY connection change within a specified time threshold. If there is no change, then the method proceeds to 316 wherein new configuration parameters are stored at 316 and a DSCM event log entry is created at 318. If the PHY connection has changed within the time threshold at 312, then a DSCW (sticky) is enabled at 314 and the method proceeds to 316. When the DSCW is enabled at 314, the DSCW may be written to a log for further action and recording.

Figure 4:
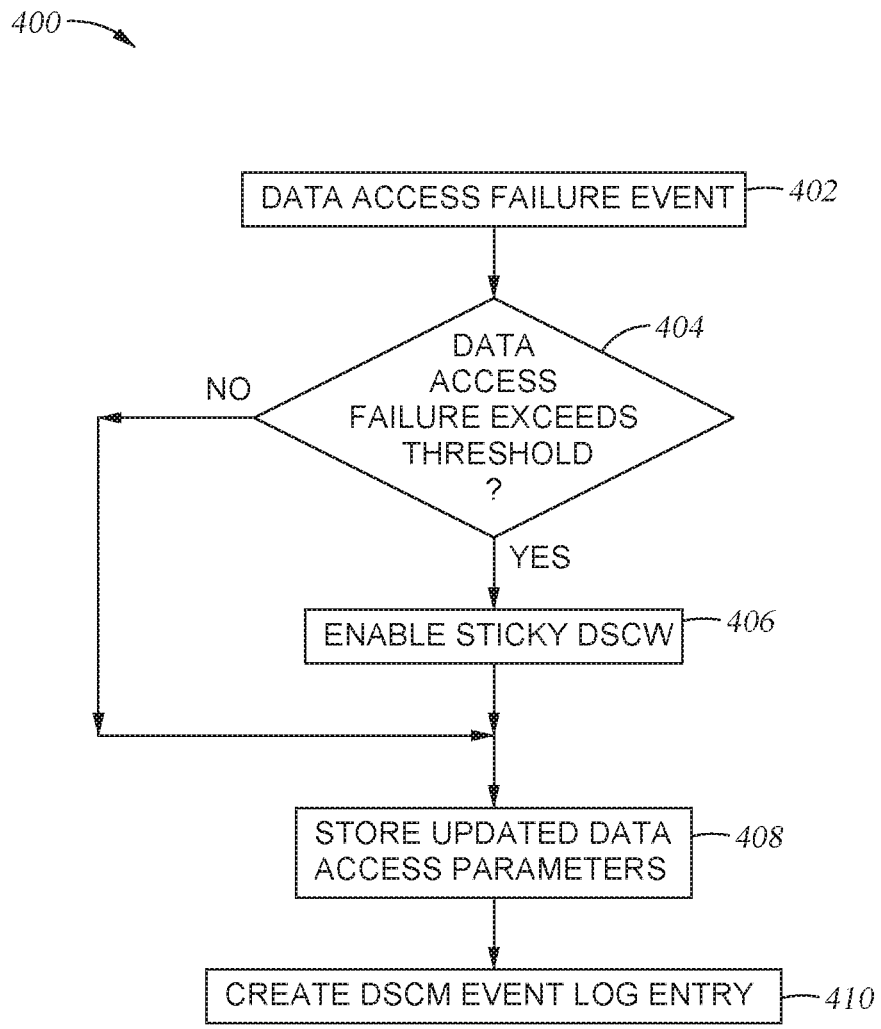
FIG. 4 is a data access failure event flow chart.

Referring to FIG. 4, a data access failure event flow diagram 400 is illustrated. At 402 a data access failure event occurs. At 404, a query is run to determine if data access failure exceeds a threshold value. If a threshold is not exceeded at 404, then the method proceeds to 408 wherein updated data access parameters are stored. If a threshold was exceeded at 404, then a DSCW (sticky) is enabled at 406 and the method proceeds to 408. From 408, a DSCM event log entry is created at 410.

Referring to FIGS. 5 and 6, a DSCM control mode page format overview is illustrated. The parameter descriptor may be comprised of a DSCM parameter ID which has a unique identifier for each DSCM descriptor. An enable bit is also presented wherein the bit enables or disables the DSCM parameter (1=enable, 0=disable). (See FIG. 6, Bit 7, Byte 0) A primary threshold is provided with an ability to configure the primary threshold for the parameter (specific definitions may vary with a parameter identification) as presented in FIG. 6. The secondary threshold is provided, as presented in FIG. 6, which provides the ability to configure the primary threshold for the parameter (specific definition varies with parameter ID). A relative trigger priority is provided which specifies a priority of the parameter ID relative to other parameters (e.g., 1=Trigger DSCW if this parameter crosses the threshold, 2=only trigger is another parameter also triggers, 3=only trigger if 2 other parameters trigger). This control provides a mechanism for some users to configure relative importance of DSCM parameters for respective systems. A separate processor may be provided to send and receive data related to the DSCM control mode page. The separate processor may be connected to the controller for the storage device and may be further connected to the DSCM.

Referring to FIGS. 7A and 7B, a DSCM parameter list is provided. Each parameter description and threshold usage is described, as non-limiting embodiments. In embodiments, attempts to disable or restrict reporting (e.g. widen threshold criteria) would not be applied until a next sanitization operation as an extended security policy. Following sanitization, there is no longer any valid data on the device that may be compromised and the host would be aware of data loss. For DSCM mode parameters updates, this update policy hinders the ability to suppress DSCW reporting during or after a silent data theft attempt has been detected.

Referring to FIG. 8, a DSCM log page format is illustrated. The DSCM log page contains information on all DSCM events and DSCM parameter values at those events. The DSCM log entries are created regardless of the configuration of the DSCM or whether the DSCW has been triggered or reported. The DSCM log entries are immutable and not cleared during the device life.

Referring to FIG. 9, the DSCM event log entry format is illustrated. FIG. 10 describes a DSCM parameter information descriptor format. Referring to FIG. 9, POH, is defined as the power on hours at the time of a DSCM event. DSCM event type describes the type of event wherein 0=power cycle event entry, 1=link reset sequence entry, 2=unauthorized data access attempt event entry. The DSCW parameter trigger count is a count of the number of DSCM parameters that exceeded primary and secondary thresholds (0=no parameters triggered). The DSCM parameter ID is a unique identifier for each DSCM descriptor. The "enable" field shows a state of the DSCM enable bit at the time of the DSCM event. The DSCM parameter value is a measured value of the DSCM parameter at the time of the DSCM event. The "primary threshold" is the state of the DSCM mode page primary threshold for this parameter at the time of the DSCM event. The "secondary threshold" is the state of the DSCM mode page secondary threshold for this parameter at the time of the DSCM event. The "relative trigger priority" is the state of the DSCM mode page relative trigger priority for this parameter at the time of the DSCM event.

In the embodiments provided warnings may be visual warning(s) to a user. In other embodiments, the warning may be a SMART information exception warning that is provided to a host.

In one non-limiting embodiment, an arrangement is disclosed comprising at least one memory arrangement configured to store and retrieve data, a body defining an internal volume, the at least one memory arrangement placed within the internal volume, a device security compromised monitor placed within the internal volume, at least one temperature sensor placed within the internal volume connected to the device security compromised monitor, at least one humidity sensor placed within the internal volume and connected to the device security compromised monitor, at least one global positioning system placed within the internal volume and connected to the device security compromised monitor, at least one voltage monitor placed within in the internal volume and connected to the device security compromised monitor, at least one RV sensor placed within the internal volume and connected to the device security compromised monitor and at least one interconnection between the memory arrangement and the device security compromised monitor and a host to transfer and receive data.

In another non-limiting embodiment, the arrangement may further comprise an authentication manager placed within the internal volume.

In another non-limiting embodiment, the arrangement may further comprise a port configuration identification system.

In another non-limiting embodiment, the arrangement may further comprise at least one processor configured to prepare a control mode page as an input to the device security compromised monitor.

In a still further embodiment, the arrangement may be configured wherein the device security compromised monitor is configured to prepare a log warning generated by inputs of at least one of the temperature sensor, humidity sensor, voltage monitor, global positioning system and RV sensor.

In another non-limiting embodiment, the arrangement may be configured wherein the device security compromised monitor is configured to report values of temperature, voltage, position and humidity over a threshold limit.

In another non-limiting embodiment, a method is disclosed comprising monitoring at least one power on event for a smart device, wherein the monitoring is related to at least one of an environmental parameter, a position, a system configuration, a power interruption, an unauthorized data access attempt, and a voltage, loading data related to at least one of a stored environmental parameter, a position, a system configuration, power interruption, an unauthorized data access attempt and a voltage from a prior power on condition, comparing the at least one environmental parameter, the position, the system configuration, power interruption, an unauthorized data access attempt and the voltage monitored for the smart device to the at least one stored environmental parameter, position, system configuration, power interruption, unauthorized data access attempt and the voltage, determining when the at least one environmental parameter, position, system configuration, power interruption, unauthorized data access attempt and voltage, monitored for the smart device exceeds a threshold value, creating a warning when the at least one environmental parameter, position, system configuration, power interruption, unauthorized data access attempt and voltage monitored for the smart device exceeds the threshold value and storing a new environmental parameter, position, system configuration, power interruption, unauthorized data access attempt and voltage value from the monitoring of the at least one power on event for the smart device.

In another non-limiting embodiment, the method may further comprise creating a log event containing the warning when the at least one environmental parameter, position and voltage monitored for the smart device exceeds the threshold value.

In a still further embodiment, the method may be performed wherein the smart device is a memory arrangement.

In another embodiment, the method may be accomplished wherein the at least one environmental parameter is a temperature inside the smart device.

In another embodiment, the method may be accomplished wherein the at least one environmental parameter is a humidity inside the smart device.

In a still further embodiment, the method may be accomplished wherein the warning is a visual warning or SMART Information Exception Warning to a user.

In a still further embodiment, the method may be accomplished wherein the log event may only be erased during a sanitizing event.

In another embodiment, the method may be accomplished wherein the monitoring of the system configuration entails monitoring a phy configuration.

In another embodiment, the method may be accomplished wherein the log event may not be erased.

In another non-limiting embodiment, a method is disclosed comprising monitoring at least one data access failure event in a memory arrangement, determining when the at least one data access failure event exceeds a threshold and creating a warning when the data access failure exceeds a threshold.

In a still further embodiment, the method may further comprise creating a log containing the warning when the data access failure exceeds the threshold.

In another non-limiting embodiment, a method is disclosed comprising: performing a link reset sequence event, determining if a change in a host WWID occurs within a time threshold, creating a warning when the change in the host WWID occurs within the time threshold, determining if a port configuration change occurs within a second time threshold, creating a warning when the power configuration change occurs within the second time threshold, determining if a change in phy connection occurs within a third time threshold and creating a warning when the change in the phy connection occurs within the third time threshold.

In another non-limiting embodiment, the method may further comprise storing at least one new configuration parameter when the phy connection change does not occur within third time threshold.

In a still further embodiment, the method may further comprise creating a device security compromised monitor event in a log.

In another embodiment, an arrangement is disclosed, comprising means for monitoring at least one power on event for a smart device, wherein the monitoring is related to at least one of an environmental parameter, a position, a system configuration, a power interruption, an unauthorized data access attempt, and a voltage, means for loading data related to at least one of a stored environmental parameter, a position, a system configuration, a power interruption, an unauthorized data access attempt and a voltage from a prior power on condition, means for comparing the at least one environmental parameter, the position, the system configuration, the power interruption, an unauthorized data access attempt and the voltage monitored for the smart device to the at least one stored environmental parameter, position, system configuration, power interruption, unauthorized data access attempt and the voltage, means for determining when the at least one environmental parameter, position, system configuration, power interruption, unauthorized data access attempt and voltage, monitored for the smart device exceeds a threshold value, means for creating a warning when the at least one environmental parameter, position, system configuration, power interruption, unauthorized data access attempt and voltage monitored for the smart device exceeds the threshold value and means for storing a new environmental parameter, position, system configuration, power interruption, unauthorized data access attempt and voltage value from the monitoring of the at least one power on event for the smart device.

In another non-limiting embodiment, the arrangement may further comprise creating a log event containing the warning when the at least one environmental parameter, position and voltage monitored for the smart device exceeds the threshold value.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A solid state drive (SSD), comprising:
   at least one memory arrangement configured to store and retrieve data;

a body defining an internal volume receiving power from a host, the at least one memory arrangement placed within the internal volume;

a device security compromised (DSC) monitor placed within the internal volume;

at least one temperature sensor placed within the internal volume connected to the DSC monitor, wherein the at least one temperature sensor is configured to:
detect steady state temperature; and
provide the detected steady state temperature to the DSC monitor;

at least one humidity sensor placed within the internal volume and connected to the DSC monitor, wherein the at least one humidity sensor is configured to:
detect relative humidity; and
provide the detected relative humidity to the DSC monitor;

at least one global positioning system placed within the internal volume and connected to the DSC monitor, wherein the at least one global positioning system is configured to:
detect a location; and
provide the detected location to the DSC monitor;

at least one voltage monitor placed within in the internal volume and connected to the DSC monitor, wherein the at least one voltage monitor is configured to:
detect changes in incoming power levels; and
provide the detected changes in incoming power levels to the DSC monitor;

at least one RV sensor placed within the internal volume and connected to the DSC monitor, wherein the at least one RV sensor is configured to:
detect acceleration of the body when power is no longer received from the host; and
provide the detected acceleration to the DSC monitor; and at least one interconnection between the memory arrangement and the DSC monitor and the host to transfer and receive data, wherein the DSC monitor is configured to trigger a DSC warning that persists until a data sanitization process is completed, the DSC warning being responsive to the detected steady state temperature, the detected relative humidity, detected location, the detected changes in incoming power levels, or the detected acceleration falling outside of expected bounds.

2. The SSD according to claim 1, further comprising:
an authentication manager placed within the internal volume.

3. The SSD according to claim 1, further comprising:
a port configuration identification system.

4. The SSD according to claim 1, further comprising:
at least one processor configured to prepare a control mode page as an input to the DSC monitor.

5. The SSD according to claim 1, wherein the DSC monitor is further configured to prepare a log warning triggered by inputs of at least one of the temperature sensor, the humidity sensor, the voltage monitor, the global positioning system and the RV sensor.

6. The SSD according to claim 1, wherein the DSC monitor is configured to report values of temperature, voltage, position and humidity that exceeded a threshold limit.

7. A method, comprising:
monitoring, for a solid state drive (SSD), an environmental parameter, a position, a system configuration, a power interruption comprising an acceleration of the SSD resulting in a power loss, an unauthorized data access attempt, and a voltage for the SSD;

loading threshold data related to a stored environmental parameter, a stored position, a stored system configuration, a stored power interruption, a stored unauthorized data access attempt and a stored voltage from a prior power on condition;

comparing the environmental parameter, the position, the system configuration, the power interruption, the unauthorized data access attempt and the voltage monitored for the SSD to the stored environmental parameter, the stored position, the stored system configuration, the stored power interruption, the stored unauthorized data access attempt and the stored voltage;

determining whether the environmental parameter, the position, the system configuration, the power interruption, the unauthorized data access attempt and the voltage monitored for the SSD exceeds a threshold value;

creating a warning responsive to the environmental parameter, the position, the system configuration, the power interruption, the unauthorized data access attempt and the voltage monitored for the SSD exceeding the threshold value, wherein the warning is removed upon performing a data sanitization process; and storing a new environmental parameter, a new position, a new system configuration, a new power interruption, a new unauthorized data access attempt and a new voltage value from the monitoring of a power on event for the SSD.

8. The method according to claim 7, further comprising:
creating a log event containing the warning responsive to the environmental parameter, the position and the voltage monitored for the SSD exceeding the threshold value corresponding to the environmental parameter, the position and the voltage.

9. The method according to claim 7, wherein the SSD is a memory arrangement.

10. The method according to claim 7, wherein the environmental parameter is a temperature inside the SSD.

11. The method according to claim 7, wherein the environmental parameter is a humidity level inside the SSD.

12. The method according to claim 7, wherein the warning is a visual warning to a user.

13. The method according to claim 7, wherein the warning is a Self-Monitoring, Analysis and Reporting Technology (SMART) Information Exception Warning to a host.

14. The method according to claim 8, wherein the log event may be erased only during a sanitizing event.

15. The method according to claim 7, wherein the monitoring of the system configuration entails monitoring a phy configuration.

16. The method according to claim 8, wherein the log event may not be erased.

17. A solid state drive (SSD), comprising:
at least one memory arrangement configured to store and retrieve data;

a body defining an internal volume, the at least one memory arrangement placed within the internal volume, the body connected to, and receiving power from, a host;

a device security compromised (DSC) monitor means to monitor steady state temperature, relative humidity, location, changes in incoming power levels, and acceleration, wherein the DSC monitor means are placed within the internal volume and configured to trigger a DSC warning that persists until a data sanitization process is completed, the DSC warning configured to be triggered upon detecting acceleration of the body coupled with ceasing receipt of power from the host; and at least one interconnection between the memory arrangement and the DSC monitor and the host to transfer and receive data.

18. The SSD of claim 17, further comprising means for loading threshold data related to a stored environmental parameter, a stored position, a stored system configuration, a stored power interruption, a stored unauthorized data access attempt and a stored voltage from a prior power on condition.

19. The SSD of claim 18, further comprising means for comparing the environmental parameter, the position, the system configuration, the power interruption, the unauthorized data access attempt and the voltage monitored for the SSD to the stored environmental parameter, the stored position, the stored system configuration, the stored power interruption, the stored unauthorized data access attempt and the stored voltage.

20. The SSD of claim 19, further comprising means for determining whether the environmental parameter, the position, the system configuration, the power interruption, the unauthorized data access attempt and the voltage monitored for the SSD exceeds a threshold value.

21. The SSD of claim 20, further comprising means for creating a warning responsive to the environmental parameter, the position, the system configuration, the power interruption, the unauthorized data access attempt and the voltage monitored for the SSD exceeding the threshold value.

22. The SSD of claim 21, further comprising means for storing a new environmental parameter, a new position, a new system configuration, a new power interruption, a new unauthorized data access attempt and a new voltage value from the monitoring of a power on event for the SSD.

23. The SSD of claim 22, further comprising means for creating a DSC monitor log event containing the warning responsive to the environmental parameter, the position and the voltage monitored for the SSD exceeding the threshold value corresponding to the environmental parameter, the position and the voltage.

* * * * *